United States Patent Office 3,216,481
Patented Nov. 9, 1965

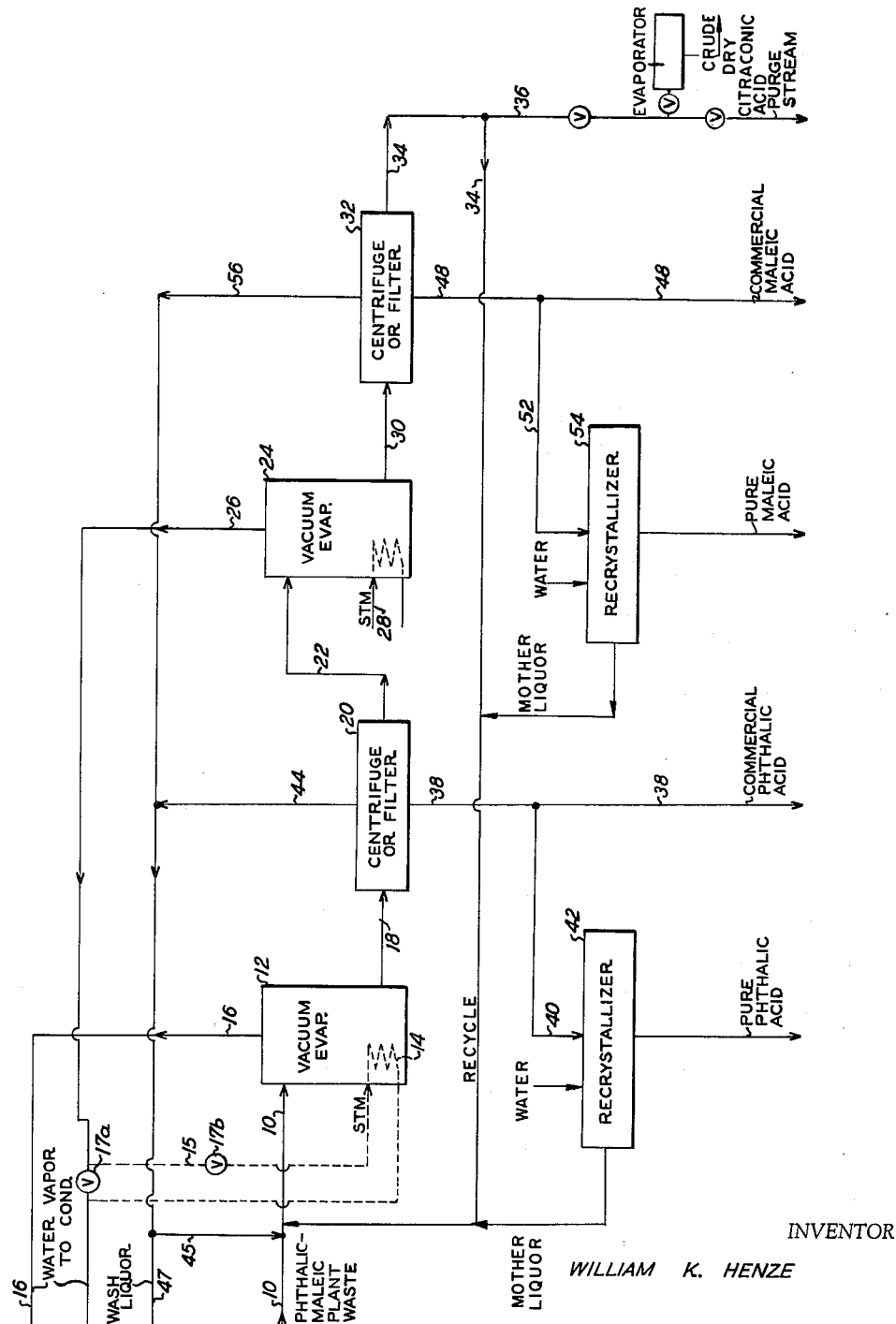

3,216,481
RECOVERY OF PHTHALIC AND MALEIC ACID FROM SOLUTIONS
William K. Henze, Marblehead, Mass., assignor to The Badger Company, Inc., a corporation of Massachusetts
Filed Apr. 17, 1962, Ser. No. 188,196
12 Claims. (Cl. 159—47)

This invention relates to separation of phthalic acid from maleic acid by fractional crystallization.

In the production of phthalic anhydride a substantial amount of maleic anhydride is also formed, usually from oxidation in gaseous or liquid phase of hydrocarbons of the nature of naphthalene, o-xylene, alkyl naphthalenes and the like. The common methods of purification of the predominantly phthalic anhydride reaction product result in production of large quantities of aqueous solutions containing both phthalic acid and maleic acid which also may contain only small quantities of other organic acids, usually citraconic, as the prevailing impurity. Such mixture recurring in so-called "waste" solutions has been difficult to separate and consequently it has usually been subject to either relatively expensive isomerization, catalytically or merely with heat, heating the solution at high conversion temperature to isomerize the maleic acid to fumaric acid, or the solution is wasted without attempt at recovery of these valuable acid components.

At temperatures above 200° F., that is, about the boiling point of water under standard conditions, simple distillation of an aqueous waste solution of maleic acid would largely convert it to fumaric acid, a cheaper commercial product. The present invention operates to remove water by distillation at a maximum temperature below this inversion tmeperature of maleic to fumaric acid. It also operates to remove each component of the waste solution in a series of different low temperatures, each selected to remove and simultaneously separate the phthalic acid from the maleic acid. Thus, such waste solution is now efficiently handled to recover each component, and particularly the maleic acid is recovered as such, its most valuable form.

The invention is based on the principle that the solubility in water of phthalic acid increases far more rapidly than maleic acid with rising temperature. The present invention takes advantage of this principle by controlling the temperature of evaporation of the water, using vacuum distillation, whereby the solution may be evaporated under a wide range of temperatures. Consequently, the dilute solution of maleic and phthalic acid is first concentrated by vacuum distillation at a relatively low temperature at which the phthalic acid whose solubility is comparatively low first saturates and crystallizes out, the concentartion of the solution being continued while the phthalic acid substantially separates, until the solution approaches saturation of the maleic acid component. Thereafter, the temperature is raised substantially and the evaporation is then conducted at a conventionally selected lower vacuum (higher pressure). At the higher temperature the phthalic acid has substantially higher solubility, and, therefore, the solution is unsaturated as to this component. As the concentration is continued at the higher temperature it first becomes saturated in the less soluble component, the maleic acid, which then separates by crystallization. Separation of the maleic acid continues at the selected higher temperature which may be, and preferably is, the highest practical temperature below isomerization to fumaric acid. Continued evaporation ultimately brings the concentration of any remaining phthalic acid up to its saturation point. At that time, concentration of the solution is discontinued and the residue can then be recycled for admixture with fresh incoming solution from which phthalic and maleic acids are to be recovered.

The crude waste plant solutions may sometimes contain quantities of such other acids as citraconic, which might tend to build up in the system with continued concentration and recycle of residues. Consequently, it is useful either to bleed off some of the final unrecovered liquid concentration product, removing the bleed-off portion from the system only in quantity to separate as much citraconic acid as may be present in the original waste water, thereby to prevent its continued build-up in the system; or alternatively, the total concentration liquid after separation of maleic acid crystals can be disposed of outside of the system without recycle. That complete disposal can be effected only occasionally from every third, fourth or seventh, etc., batch, depending only on the input quantity of citraconic acid to the system, to prevent its excessive build-up.

The separated phthalic acid crystals after separation from the low temperature distilland concentrate, as well as the crop of separated crystals of maleic acid in the high temperature distilland concentrate may each be filtered or separated by centrifuging from the concentrated mother liquor and the cakes may be used directly as commercial acids. Preferably, each cake is washed with cold fresh water whereby it will have better than 99% purity. If they are not washed, they remain coated with concentrated mother liquor and upon drying will have a lower but, nevertheless, substantial "commercial grade" purity. It may be preferable to wash the cakes, each separately with cold raw waste solution entering the recovery system in which the impurity acid components are small because of the comparatively high dilution in the entering waste liquids. The wash waters from this, or even washings with fresh waters, can be recycled to the raw input solution to the system for recovery of acid values contained in the washings. The cakes, with or without one or more such washings, can be further recrystallized from water for improved purity, and such mother liquors, too, can be recycled as input to the system.

Various modifications of this method known in the art of evaporation and crystal recovery, including washing and drying of crystals to improve their purity and maketability, will be applicable here. For instance, the vapors from the high temperature distillation can be passed in heat exchange to effect evaporation in the lower temperature operation, in a series semicontinuously, interrupting the flow of liquid and vapors only to remove accumulated crops of suspended crystals in each stage.

The temperature range of operation is limited only by practical considerations. For instance, the lowest operative temperature limit is dictated by the rate of evaporation available using extremely high vacuum to effect evaporation at a low temperature. Considerations of this character indicate that the lowest practical temperature might be of the order of 50° F., and it would be preferable for the low temperature evaporation to operate in the range of 50 to 125° F. for initial separation of the phthalic acid from the input solution. The temperature for a separation of the maleic acid is some temperature substantially higher than that selected for the phthalic acid and the temperature range for each, accordingly, may overlap. Thus, the temperature for separation of the maleic acid will be selected to be at least 25° F. higher than that at which the phthalic acid was separated and may range from about 75° F. to 200° F. The upper temperature limit and its corresponding pressure will be selected not to exceed that at which isomerization of the maleic acid to fumaric begins to take place, and comprises, therefore, the upper practical limit. The temperature under which the evaporation is to be effected for each stage is controlled by the degree of vacuum applied.

The invention is further illustrated in the drawing which shows a simple operating cycle.

Raw feed solution which is unsaturated in both phthalic and maleic acids enters the system through line 10, passing to a vacuum evaporator 12, adjusted to evaporate water in the stated range of 50 to 125° F. The solution is heated by a steam coil 14 to the desired temperature. The water vapor is withdrawn overhead through line 16, passing to a condenser (not shown) in which the water is condensed and through which the selected vacuum can be maintained, that is, a vacuum high enough to maintain the selected low evaporating temperature. At the low selected temperature, the phthalic acid will reach saturation first and, consequently, will begin to crystallize first, being the less soluble at the low temperature, and as the water evaporation is continued phthalic acid crystals will continue to separate until the solution approaches the approximate saturation concentration at that evaporation temperature for the maleic acid.

The solution and suspension of crystals therein is withdrawn through line 18, passed through a filter or centrifuge 20 in which the crop of crystals are separated from the mother liquor, and the mother liquor is then passed through line 22 to a second evaporator stage 24. That second evaporator stage 24 is maintained at a contrastingly higher temperature in the range of 75 to 200° F., adjusting the vacuum pressure in the still to maintain the selected higher temperature as stated, and the solution is then further concentrated.

At that higher temperature the solubility of the phthalic acid is very substantially increased, in marked contrast to the solubility rate of the maleic acid which, as stated, rises much less with temperature than the phthalic acid. Continued evaporation at the higher temperature saturates the solution in maleic acid which begins to separate as crystals, while maintaining the phthalic acid in solution. The water vapors pass overhead through line 26 through which the vacuum is drawn, passing to a condenser for condensing the water (not shown).

If desired, the vapors passing through line 26 can be passed through steam coil 14 by way of line 15, valves 17b being open and 17a closed to control such circuit, thus providing heat for the first evaporator 12 before the vapors are condensed. The high temperature heat for evaporator 24 is supplied through a steam coil 28. The evaporation in evaporator 24 is continued until the solution reaches the saturation condition at the higher temperature for the phthalic acid, at which point large quantities of the maleic acid crystals have separated.

The maleic acid crystal suspension in mother liquor is withdrawn from evaporator 24 through line 30, passed through a filter or centrifuge 32 in which the maleic acid crystals are separated, and the concentrated mother liquor still containing dissolved acids continues through line 34, and may be recycled into the fresh incoming waste acid solution entering through line 10 for further treatment in the system. Since this recycle in line 34 is highly concentrated not only in phthalic and maleic acid, but also in other impurities like citraconic, it is possible to bleed off all or only a portion from the system through a purge line 36. It is usually preferred to bleed off from time to time enough of the recycle liquid to take with it some of the impurities such as citraconic acid, usually corresponding to about as much citraconic acid as enters the system as dilute feed through line 10, thereby preventing build-up of such impurities in the system by continuous recycle.

The phthalic acid filter cake from the centrifuge 20 may be washed, usually with cold water, and the purified solid phthalic acid may be removed through line 38, and used directly as commercial phthalic acid, or it may be passed by line 40 for further recrystallization from water to obtain a product of even greater purity in tank 42. Any wash water leaving the centrifuge or filter 20 through line 44 can be withdrawn from the system through line 47 or recycled to dilute waste liquor entering the system through line 10 by line 45. Similarly, maleic acid filter cake collected in centrifuge or filter 32 may be withdrawn through line 48 as a commercially pure product, particularly if the filter cake is washed with cold water, or it may be further purified by transfer through line 52 to recrystallizing tank 54 and repurified by recrystallizing from water. Any wash liquor leaving the centrifuge or filter 32 is withdrawn through line 56 leaving the system through line 47, or it may be recycled by line 45 to dilute waste liquor entering the system through line 10 for recovery. Similarly recrystallization mother liquors may be recycled to line 10 (not shown) after use with one or more batches of crystals, and mother liquor from the maleic acid recrystallization can be returned to line 22 for second stage evaporation directly, if desired.

The following examples illustrate the practice of this invention:

Example I

A feed solution consisting of 45.4 g. phthalic acid, 136.1 g. maleic acid and 62.1 g. citraconic acid, and 756.4 g. water (1000 g. total solution) is evaporated at 100° F. under a vacuum pressure of 49 mm. Hg. 390 g. of water were vaporized and the residual crystal slurry was filtered, producing a wet filter cake of 45 g. and 554 g. of filtrate. The wet cake was washed twice with equal quantities of 61° F. tap water and dried to produce 32.4 g. of dry phthalic acid crystals. It had a melting point in the range of 198–199° C. The filtrate from the first evaporation filtration stage was sent to a second evaporator maintained at a vacuum pressure of 345 mm. Hg to effect further evaporation at 175° F. 294 g. of water were thus removed by the second evaporation and the crystalline slurry produced was filtered to produce 116 g. of filtrate and 95 g. of wet maleic acid as filter cake. The wet cake was directly dried and washed with an equal weight of ice water and gave 33 g. of ultimately dried maleic acid solids having a melting point of 124–128° F. The filtrate directly dried contained 77 g. solids.

Example II 1500 g. raw feed solution consisting of 76.5 g. of phthalic acid, 241.2 g. maleic acid, 108.0 g. citraconic acid and 1074.3 g. of water was passed to a first evaporator maintained at a temperature of 100° F. The initial pressure of 50 mm. Hg at the start of the evaporation was reduced continuously to 24 mm. Hg at the end as the boiling point tended to rise with increasing concentration. 585 g. of water were removed and the slurry was filtered to give 814 g. of filtrate and 78 g. of phthalic acid wet cake 23 grams present in the raw feed were unaccounted for. 26 g. of the wet filter cake was dried at 250° F. and became reduced to 21.8 g., having a melting point of 189 to 192° C. A second 26 g. portion of the wet filter cake was dried in a vacuum dessicator over concentrated $H_2SO_4$ and $P_2O_5$ and gave 23 g. of crystals melting at 188–192° C. The third 26 gram portion of wet filter cake, after washing twice with distilled water at 77° F., resulting in a 1 gram loss, was divided into two 12.5 g. portions and the first portion thereof dried in an oven at 250 F. and gave a 10.2 g. phthalic acid product having a melting point of 197 to 198° C. The second 12.5 g. portion was dried in a desiccator, as before, and gave 10.2 g. of phthalic acid crystals also melting at 197–198° C. The 814 gram filtrate was passed to a second stage evaporator and heated at 175° F. and the initial pressure of 305 mm. Hg was decreased as evaporation continued to 120 mm. Hg. 432 g. of water were removed in the second stage, leaving a filtrate of 57 g. and a wet cake of maleic acid on the filter of 286 g. There was a total of 25 g. loss unaccounted for in the second stage of the system. 95.3 g. of the wet filter cake directly dried in an oven at 250° F. gave 81 g. of dry maleic acid product melting at 120–128° C. The same quantity of wet filtered cake dried in the vacuum desiccator gave 88.1 g. melting at 120–124° C. The third 95.3 g. wet maleic acid filter cake portion was washed twice with equal weights of distilled ice water, and one 4.7 g. portion thereof was dried at 250° F. in the oven giving 3.3 g. of maleic acid product melting at 131–133° C., and a second 4.7 g. portion was dried in a vacuum desiccator and gave 4.7 g. maleic acid product melting at 122–126° C. The final filtrate after drying gave 40.5 g. of solids, mostly citraconic, which was substantially crude citraconic melting at from 66 to 116° C. The overall solid recovery of the initial 76.5 phthalic acid was 65.2 g. Of the initial 241.2 g. maleic acid, 176.5 g. was recovered in the second stage evaporation and of the initial 108 g. citraconic acid in the feed, 40.5 g. of crude residue were recovered. Thus, of the 426 g. of dissolved solids in the feed, 283.2 g. were recovered and the remainder is accounted for only as dissolved in the wash water used to purify the filter cakes.

*Example III*

A feed of 1000 ml. of solution containing 5% phthalic acid, 16% maleic acid and 7% citraconic acid, the percents being by weight, was evaporated under vacuum at 100° F. to remove about ½ of the water and the crop crystals were filtered, washed with cold water and dried. The filtrate was then vacuum evaporated at 175° F. until about ½ of the solution again was evaporated and the slurry again filtered, washed with cold water and dried. A portion of each cake was recrystallized from water. Yields and purities are listed as follows:

|  | 1st crystal cake | 2nd crystal cake |
| --- | --- | --- |
| Washed and dried cakes: |  |  |
| Weight of cake, grams | 32.4 | 33.0. |
| Purity by polarographic analysis, wt. percent. | 99.2 (PA content) | 81.7 (MA content). |
| Melting Point, ° C: |  |  |
| Washed and dried cake | 198–199 | 124–128. |
| Recrystallized and dried cake. | 198–201 | 130–132. |
| Pure Acid | 208 (PA) | 130.5 (MA). |

PA = Phthalic Acid.
MA = Maleic Acid.

*Example IV*

A similar crystallization experiment was made on a 1000 g. sample from an operating phthalic anhydride plant. The sample contained approximately 26 g. phthalic acid, 99 g. maleic acid and 25 g. of citraconic acid. It was processed in a similar manner as the synthetic, laboratory solution. The purity of the crystal cakes was determined by polarograph. This analysis also indicated an efficient separation of the two acids:

| Dried Cakes | 1st crystal cake | 2d crystal cake |
| --- | --- | --- |
| Weight, Grams | 16.5 | 32.6 |
| Purity by polarographic analysis, wt. percent. | 58.6 | 84.5 |

Note that these cakes were not washed before drying. Washing greatly increases the purity of the first cake by removing the water soluble maleic acid.

The described experiments prove the feasibility of separation of phthalic and maleic acid by crystallization. The method can be used to recover both acids from a phthalic anhydride plant waste stream, thereby substantially increasing the phthalic anhydride yield and resulting in a valuable byproduct.

As thus described, both phthalic and maleic acids are recovered in high yields from dilute aqueous waste solutions containing both together with other acids, essentially citraconic acid. In practical commercial operation, the final citraconic acid recovery may be effected by removing enough of the final second stage filtrate from the system to prevent citraconic acid build-up in the system. That removed portion then may be run to dryness and separation of crude citraconic acid therefrom by conventional means, and the remainder of the filtrate can be recycled to the raw input solution for further recovery in the system. The recovery crude filter cakes may be treated for recovery respectively of phthalic acid and maleic acid in any degree of purity desired by further washing once or several times with continuous increase in purity, and even with further recrystallization to obtain the degree of ultimate purity desired. Most of the losses are in the wash waters which can be recycled to the new input solution to the system.

Various modifications will occur to those skilled in the art and, accordingly, it is intended that the foregoing description and examples be regarded as illustrative and not limiting except as defined in the claims.

I claim:

1. Process of separating phthalic acid and maleic acid in separate portions from an unsaturated aqueous solution thereof, comprising first concentrating the solution by evaporation at reduced pressure and relatively low temperature beyond the saturation point of the phthalic acid contained therein to effect its substantial separation by crystallization from the said solution, said evaporation being insufficient to saturate the said solution with maleic acid, separating the phthalic acid crystals from the mother liquor and then heating the solution to a substantially higher temperature and corresponding pressure, continuing the evaporation of the mother liquor until the maleic acid crystals then separate, and separating maleic acid crystals from the mother liquor, the low temperature of the first evaporation being not less than about 50° F. and the high temperature of the second evaporation to separate maleic acid crystals being substantially above the first evaporation temperature but less than about 200° F., below about the temperature of isomerization of maleic acid to fumaric acid.

2. The method as defined in claim 1 wherein the separated concentrated mother liquor after removal of maleic acid crystals is recycled to the dilute aqueous solution for further recovery in the system.

3. The method as defined in claim 1 in which the aqueous solution containing both maleic and phthalic acids also contains citraconic acid, which substantially remains in the mother liquor after separation of maleic acid.

4. The method as defined in claim 1 in which the aqueous solution containing both maleic and phthalic acids also contains citraconic acid, which substantially remains in the mother liquor after separation of maleic acid, the said separated mother liquor following removal of maleic acid having a portion containing sufficient citraconic acid therein approximately equal to the citraconic content of the raw input solution, separated from the final mother liquor concentrate, and the remaining quantity of mother liquor is then recycled to the raw input solution whereby to prevent continuous build up of citraconic acid in the system.

5. The method as defined in claim 1 wherein the respective batches of separated crystals of phthalic acid and maleic acid are washed with water to increase their purity.

6. The method as defined in claim 1 wherein the separated crystals of phthalic and maleic acids are separately recrystallized from water to increase their purity.

7. The method as defined in claim 1 wherein the high temperature vapors of the second evaporation are passed in heat exchange with the first evaporation stage to effect evaporation therein.

8. The process of separating phthalic and maleic acids in separate portions from unsaturated aqueous solutions thereof further containing citraconic acid, comprising first concentrating the raw input solution by first evaporation at relatively low temperature in the range of 50 to 125°

F. and corresponding pressure beyond the saturation point of the phthalic acid contained therein, to effect substantial separation by crystallization of phthalic acid from the said saturated solution, said concentration step being continued to a point insufficient to saturate the said solution with maleic acid, separating the suspended crystals of phthalic acid from the mother liquor, then evaporating the mother liquor solution at a substantially higher temperature but less than about 200° F., below about the isomerization temperature of maleic to fumaric acid, and a corresponding pressure, and continuing the second evaporation until substantial separation of the maleic acid takes place from said solution, said second evaporation being continued to below the saturation concentration of either phthalic acid or citraconic acid contained therein, then separating the suspended maleic acid crystals from the second mother liquor.

9. Method as defined in claim 8 wherein the second mother liquor has separated from it a portion corresponding approximately equal to the input portion of citraconic acid to the system and the remaining portion of mother liquor is recycled to the raw inlet solution for further recovery, thereby to prevent build up of citraconic acid in the system.

10. The method as defined in claim 8 wherein the separate crops of phthalic and maleic acid crystals are washed with water to effect their further purification.

11. The method as defined in claim 8 wherein the separate crops of maleic and phthalic acid crystals are recrystallized to effect their further purification.

12. The method of separating citraconic acid from a waste stream containing large amounts of phthalic and maleic acids, comprising first separating phthalic acid by concentrating the solution at a low temperature, then separating maleic acid by concentrating the mother liquor at a higher temperature not exceeding about 200° F. to a point below which the other acids become saturated in the mother liquor and then separating solids comprising citraconic acid from the mother liquor of the second concentration.

References Cited by the Examiner
UNITED STATES PATENTS

| | | | |
|---|---|---|---|
| 1,230,163 | 6/17 | Hobsbawm et al. | 159—45 |
| 2,448,191 | 8/48 | Pike | 23—296 |
| 2,496,288 | 2/50 | Hampel | 23—296 |
| 2,496,289 | 2/50 | Hampel | 23—296 X |
| 2,496,290 | 2/50 | Hampel | 23—296 X |
| 2,832,802 | 4/58 | Kohn | 260—537 |
| 3,082,250 | 3/63 | Baldwin et al. | 260—525 X |

NORMAN YUDKOFF, *Primary Examiner.*